(12) United States Patent
Brown

(10) Patent No.: US 7,089,679 B2
(45) Date of Patent: Aug. 15, 2006

(54) MEASURING APPARATUS AND METHOD THEREFOR

(76) Inventor: C. Allen Brown, 8 Running Fox 1600 US Hwy. 64 W. 223, Sapphire, NC (US) 28774

( * ) Notice: Subject to any disclaimer, the term of this patent is extended or adjusted under 35 U.S.C. 154(b) by 0 days.

(21) Appl. No.: 10/761,701

(22) Filed: Jan. 21, 2004

(65) Prior Publication Data

US 2004/0128851 A1   Jul. 8, 2004

(51) Int. Cl.
*G01B 3/12* (2006.01)
(52) U.S. Cl. .............................. 33/772; 33/429; 33/775; 33/404; 33/392
(58) Field of Classification Search ................ 33/772, 33/774, 775, 779, 761, 769, 1 N, 424, 426, 33/429, 480, 481, 535, 194, 409, 413, 760, 33/404, 392
See application file for complete search history.

(56) References Cited

U.S. PATENT DOCUMENTS

| | | | | |
|---|---|---|---|---|
| 361,791 A | * | 4/1887 | Stoner | 33/779 |
| 437,065 A | * | 9/1890 | Wells | 33/779 |
| 925,082 A | * | 6/1909 | Davenport | 33/779 |
| 1,083,684 A | * | 1/1914 | Ifkowitsch | 33/775 |
| 1,972,122 A | * | 9/1934 | Woodyard | 33/424 |
| 1,986,551 A | * | 1/1935 | Emil | 33/769 |
| 2,204,927 A | * | 6/1940 | Cramer | 33/481 |
| 2,230,990 A | * | 2/1941 | Bennett | 33/772 |
| 2,451,595 A | | 10/1948 | Wheeler | |
| 2,495,974 A | * | 1/1950 | Kelley | 33/775 |
| 2,771,681 A | * | 11/1956 | Reinking | 33/779 |
| 2,863,388 A | | 12/1958 | Schloemer | |
| 3,006,273 A | | 10/1961 | Sommer | |
| 3,046,884 A | | 7/1962 | Pearson | |
| 3,063,370 A | | 11/1962 | Eberhardt | |
| 3,163,941 A | * | 1/1965 | Presley | 33/779 |
| 3,546,779 A | | 12/1970 | Klein | |
| 3,568,322 A | * | 3/1971 | Showers | 33/332 |
| 3,673,693 A | | 7/1972 | Evans, Jr. | |
| 3,732,623 A | | 5/1973 | Bopst, III | |
| 3,783,785 A | | 1/1974 | Frank et al. | |
| 3,791,038 A | | 2/1974 | Polydoris et al. | |
| 3,816,926 A | | 6/1974 | Gfeller | |
| 3,835,543 A | | 9/1974 | Polydoris et al. | |
| 3,896,725 A | | 7/1975 | Grover | |
| 3,998,835 A | | 11/1976 | Thornton | |
| 4,014,103 A | | 3/1977 | Roth | |
| 4,163,323 A | | 8/1979 | Bud | |
| 4,170,065 A | * | 10/1979 | Hiscott | 33/431 |
| 4,372,049 A | | 2/1983 | Hogue | |
| 4,462,167 A | * | 7/1984 | Huat | 33/339 |
| 4,700,484 A | | 10/1987 | Frank et al. | |
| 4,760,647 A | | 8/1988 | Gillis | |
| 4,794,857 A | | 1/1989 | Waters, Sr. | |
| 4,835,877 A | * | 6/1989 | Roach et al. | 33/426 |
| 4,965,944 A | * | 10/1990 | Kuze et al. | 33/760 |
| 4,967,484 A | | 11/1990 | Nosek | |

(Continued)

*Primary Examiner*—Diego Gutierrez
*Assistant Examiner*—Amy R. Cohen
(74) *Attorney, Agent, or Firm*—Myers & Kaplan, LLC; Joel D. Myers, Esq.

(57) ABSTRACT

An apparatus for measuring linear distances comprising a wheel to be rolled along a surface to be measured, wherein the wheel comprises a plurality of incremental line markers to facilitate measurement of selected intervals, and wherein the wheel is maintained within a housing dimensioned and configured to measure sizes and angles most often encountered during framing.

16 Claims, 8 Drawing Sheets

U.S. PATENT DOCUMENTS

| | | | |
|---|---|---|---|
| 4,989,342 A | 2/1991 | Nosek | |
| 4,993,159 A | 2/1991 | Hull et al. | |
| 5,195,247 A | 3/1993 | Wilcox | |
| 5,430,952 A * | 7/1995 | Betts | 33/760 |
| 5,749,522 A | 5/1998 | Smrt | |
| 6,224,285 B1 | 5/2001 | Nichols | |
| 6,408,529 B1 * | 6/2002 | Hodges | 33/429 |
| 6,553,677 B1 * | 4/2003 | Szumer | 33/480 |
| 6,571,487 B1 * | 6/2003 | Canalle | 33/760 |
| 6,574,882 B1 | 6/2003 | Kondo | |
| 6,725,556 B1 * | 4/2004 | Graham | 33/474 |
| 6,868,616 B1 * | 3/2005 | Allemand | 33/476 |
| 6,964,109 B1 * | 11/2005 | Bond | 33/414 |

* cited by examiner

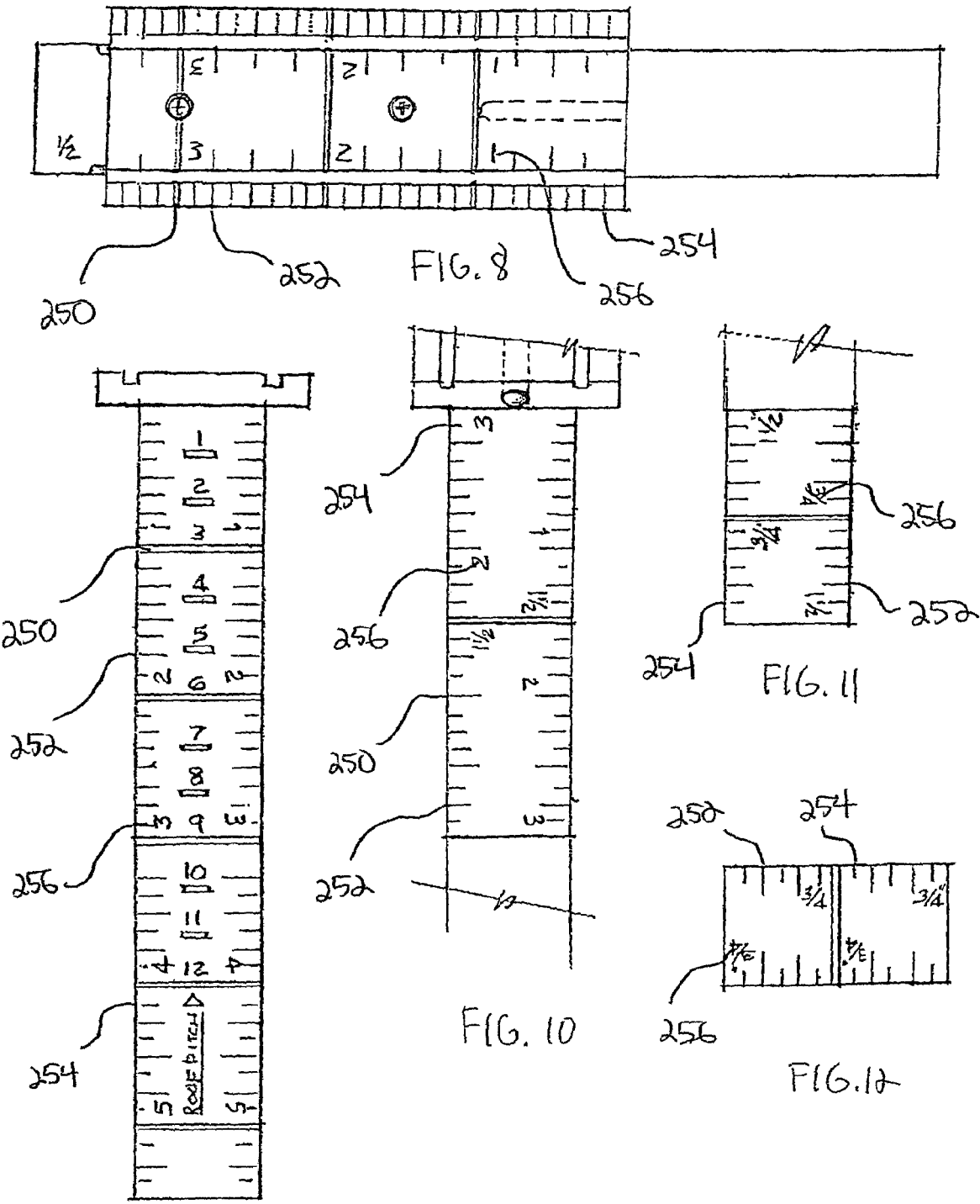

MEASURING APPARATUS AND METHOD THEREFOR

TECHNICAL FIELD

The present invention relates generally to tools, and more specifically to a tool for measuring linear distances, wherein the present invention facilitates the process of laying out framing and trim components in view of conventional methods requiring a tape measurer or ruler.

BACKGROUND OF THE INVENTION

In the construction industry, proper frame construction depends in large part on regular and uniform spacing of studs, joists, rafters and trusses at standard intervals. As such, it is frequently necessary to measure fixed/predetermined intervals or repetitive distances to ensure proper placement of building components along a workpiece.

Traditional measuring devices include calibrated sticks, such as rulers, yardsticks or folding rulers, or flexible measuring devices, such as tape measures or steel tapes. Although calibrated sticks are useful and accurate, such devices are inconvenient to transport and often cumbersome to operate, as the fixed length of such devices require multiple sticks to be laid end-to-end to measure relatively lengthy distances and/or a single stick to be laid out multiple times. For the most part, problems associated with calibrated sticks are often solved by utilizing tape measures and/or other flexible measuring devices. Despite the recognized advantages of such flexible measuring devices, the process of laying out a tape measure along a workpiece and marking the workpiece at predetermined intervals can be a tedious and time-consuming process. Moreover, tape measures typically contain a spring-return feature that makes release of the tape difficult, and often makes layout of the tape cumbersome and even dangerous through unexpected flyback or spring-return of the tape. Furthermore, if the tape cannot be secured to one end of the workpiece, two hands must be utilized to hold the tape, thus making it extremely difficult to measure and mark distances, especially when working off scaffolding, ladders or roofs.

Therefore, it is readily apparent that there is a need for a versatile measuring device that can be easily and quickly utilized to accurately measure linear distances. With regard to frame construction, there is also a need for such a device that provides straight edges and gauging blocks for measuring sizes and angles most often encountered during the framing process.

BRIEF SUMMARY OF THE INVENTION

Briefly described, in a preferred embodiment, the present invention overcomes the above-mentioned disadvantages and meets the recognized need for such a device by providing a tool for measuring linear distances, wherein the present invention facilitates the process of laying out framing and trim components in view of conventional methods requiring a tape measurer or ruler.

According to its major aspects and broadly stated, the present invention in its preferred form is a measuring apparatus and method comprising a housing and measuring wheel. More specifically, the measuring wheel comprises incremental line markers disposed along the outer edge thereof, wherein distance-demarcating numerals are preferably located at one-inch intervals along the circumference of the wheel.

The housing preferably functions as a straight edge and gauging block, wherein the housing and its component parts are dimensioned and configured to correspond to the sizes and angles most often encountered during framing. The housing also comprises measuring notches disposed on the outer edges thereof, preferably for measuring smaller distances.

The housing preferably encases the measuring wheel, wherein a portion or edge of the wheel is exposed to allow for measuring and marking a selected distance. To operate the tool, the measuring wheel is preferably rolled along a surface requiring measurement, wherein a user is able to mark the surface at desired increments measured by the incremental line markers on the wheel.

Accordingly, features and advantages of the present invention are its accuracy, convenience, speed and ease of use.

Another feature and advantage of the present invention are the sidewalls of the housing, preferably dimensioned and configured to correspond to the sizes and angles most often encountered during framing, thereby allowing the housing to function as a straight edge and/or gauging block.

Still another feature and advantage of the present invention is that the measuring notches on the housing permit the user to easily measure small distances.

Yet another feature and advantage of the present invention is its ability to measure large distances, and thus replace spring-loaded flexible measuring tapes, thereby avoiding the above-described disadvantages associated with the utilization thereof.

Still yet another feature and advantage of the present invention is its ability to measure large distances, and thus replace calibrated sticks, thereby avoiding the above-described disadvantages associated with the utilization thereof.

A further feature and advantage of the present invention is its light-weight and compact size, thereby allowing a user to conveniently retain the tool on a belt or nail apron.

Still a further feature and advantage of the present invention is its ability to be utilized on practically any surface, regardless of the shape or size thereof.

These and other features and advantages of the present invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Selected Alternate Embodiments with reference to the accompanying drawing figures, in which like reference numerals denote similar structure and refer to like elements throughout, and in which:

FIG. 8 is a top view of an alternate embodiment of the present invention;

FIG. 9 is a side view of an alternate embodiment of the present invention;

FIG. 10 is a partial view of an alternate embodiment of the present invention;

FIG. 11 is a partial view of an alternate embodiment of the present invention; and FIG. 12 is a view of a first wall of an alternate embodiment of the present invention.

DETAILED DESCRIPTION OF THE PREFERRED AND SELECTED ALTERNATIVE EMBODIMENTS

Figure 1:
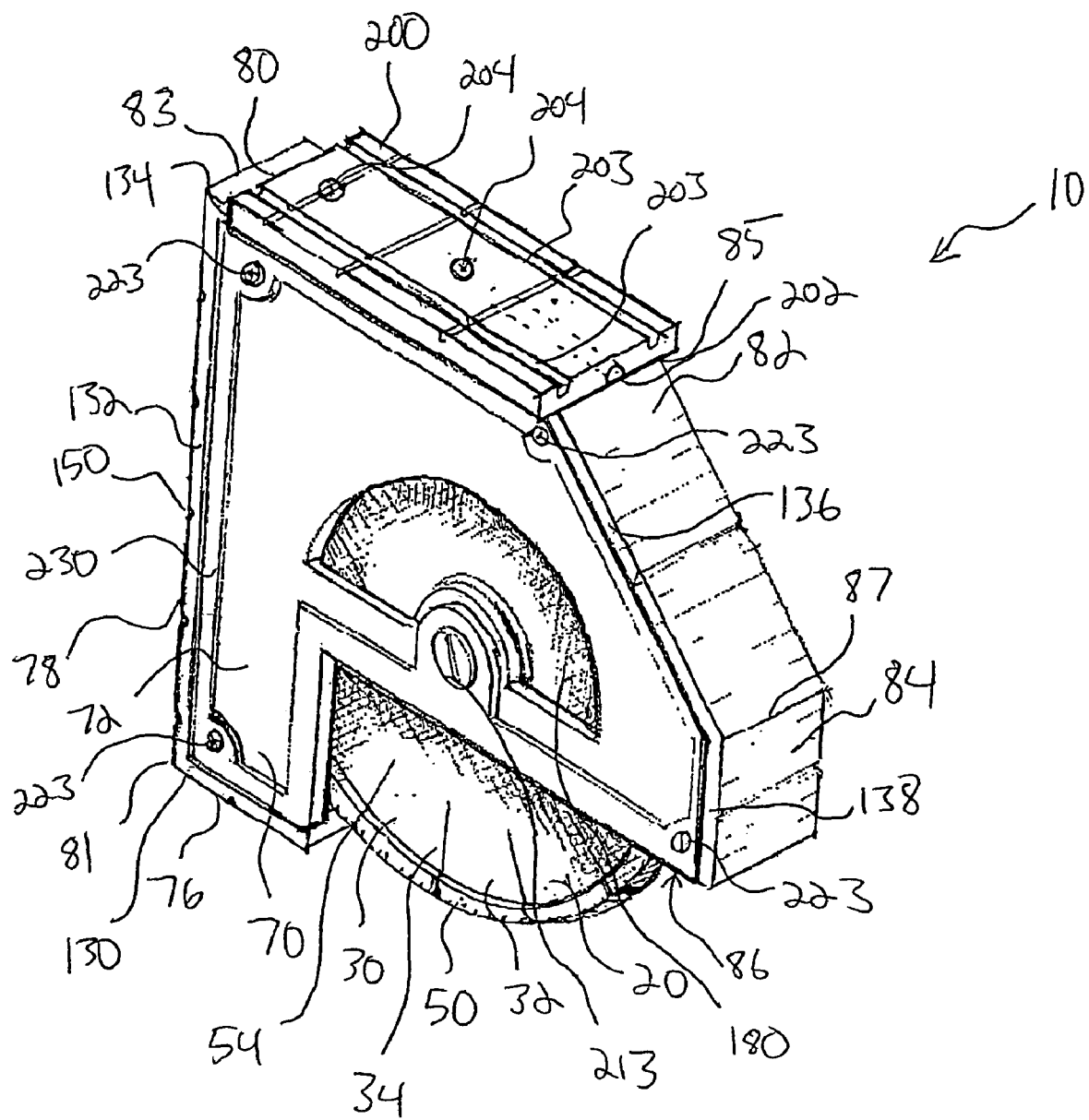
FIG. 1 is a front perspective view of a preferred embodiment of the present invention with demarcating numerals and markings removed for clarity.

In describing the preferred and selected alternate embodiments of the present invention, as illustrated in FIGS. 1–12, specific terminology is employed for the sake of clarity. The invention, however, is not intended to be limited to the specific terminology so selected, and it is to be understood that each specific element includes all technical equivalents that operate in a similar manner to accomplish similar functions.

Referring now to FIGS. 1–4, the present invention in a preferred embodiment is a tool or measuring apparatus 10 for measuring linear distances, wherein tool 10 generally comprises wheel 20 and housing 70. More specifically, wheel 20 is preferably substantially flat and disk-shaped, and preferably formed from a suitable plastic. Wheel 20 generally preferably comprises first side 30, second side 40, peripheral wall 50 and axle throughhole 60. It is recognized that wheel 20 could alternatively be formed from other suitable materials, such as, for exemplary purposes only, ceramic, metal, wood and/or other strong, rigid materials. It is further recognized that wheel 20 could possess a rubber coating disposed around peripheral wall 50 to prevent wear to wheel 20, and/or to prevent slippage from and/or damage to the surface to be measured.

Figures 5, 5A, 5B, 5C:
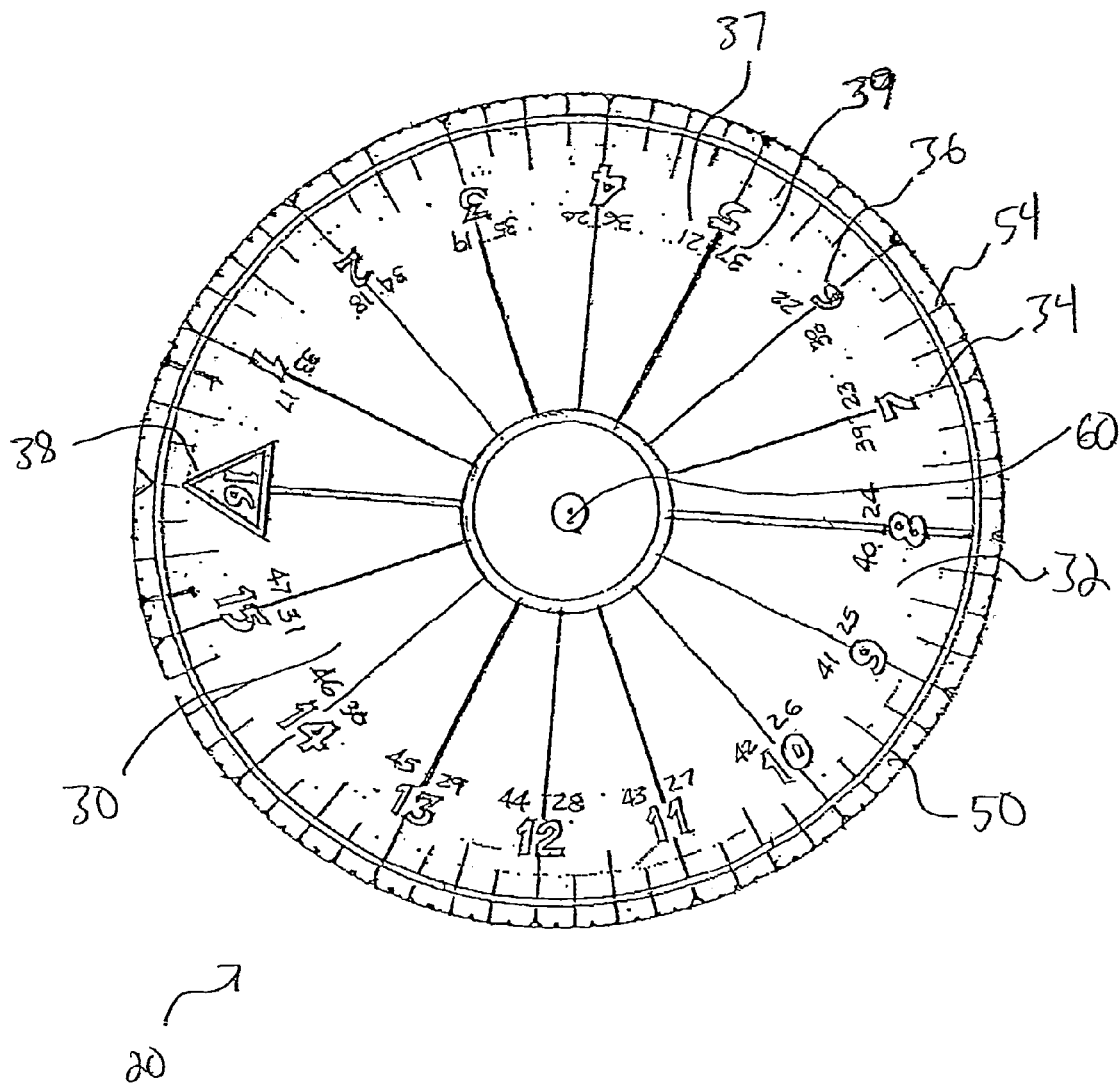
FIG. 5 is a front view of a wheel with incremental line markers and demarcating numerals.
FIG. 5A is a detail view of an alternate demarcating numeral for the wheel depicted in FIG. 5.
FIG. 5B is a detail view of an alternate demarcating numeral for the wheel depicted in FIG. 5.
FIG. 5C is a detail view of an alternate demarcating numeral for the wheel depicted in FIG. 5.
Figure 6:
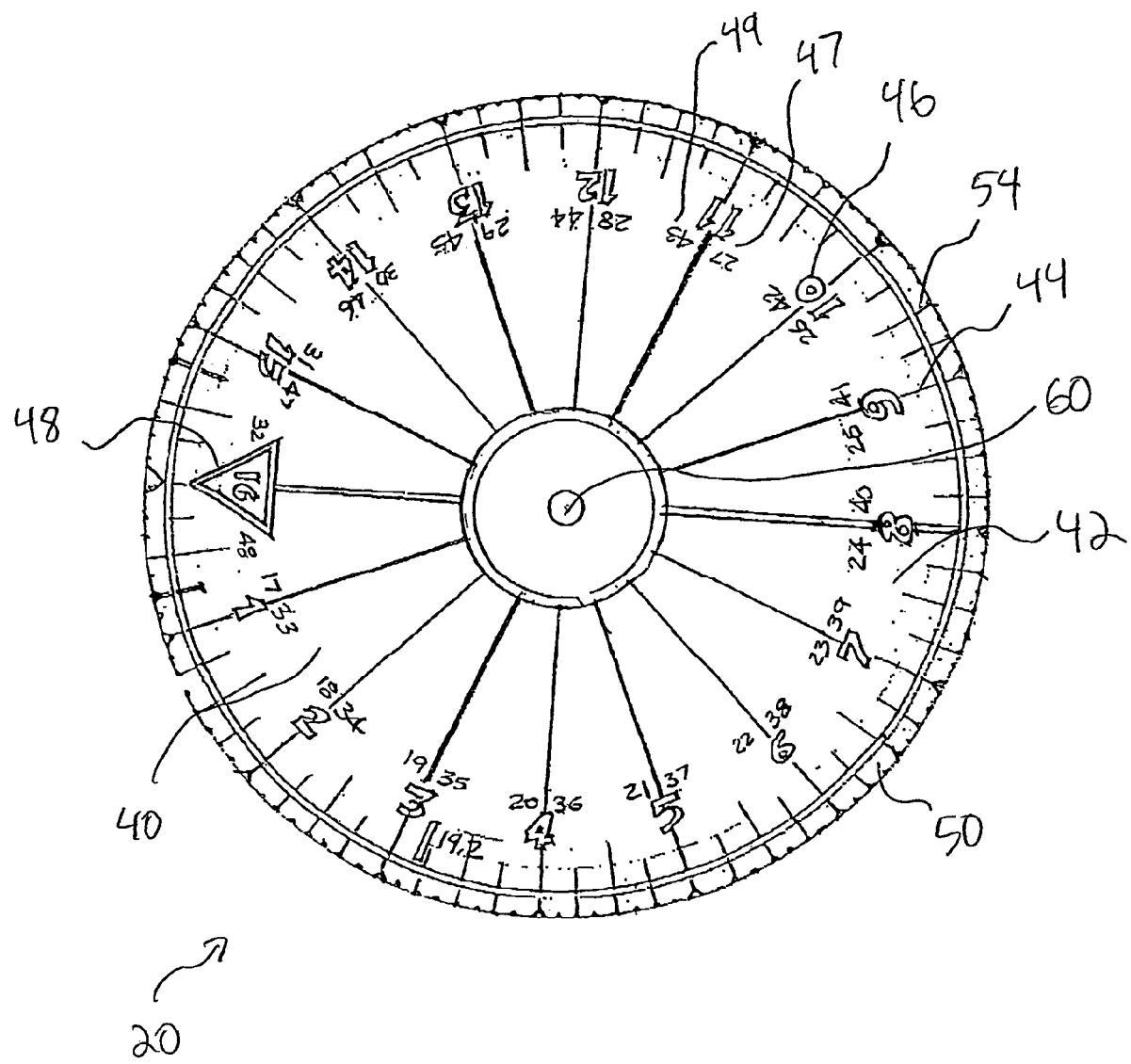
FIG. 6 is a rear view of a wheel with incremental line markers and demarcating numerals.

Referring now to FIGS. 5–6, first side 30 and second side 40 of wheel 20 are preferably solid circular plates; however, it is contemplated in an alternate embodiment that wheel 20 could comprise spokes connecting a central hub to a peripheral wall. Axle throughhole 60 is preferably centrally formed through wheel 20, wherein axle throughhole 60 is preferably dimensioned to receive an axle, as more fully described below. Peripheral wall 50 is preferably a grooved, non-slip surface having a predetermined circumference that corresponds to a standard linear distance commonly encountered in the building industry, wherein such standard linear distances may include, without limitation, sixteen inches, nineteen and two-tenths inches and/or twenty-four inches. Specifically, peripheral wall 50 preferably comprises a circumference of sixteen inches; however, it is recognized that peripheral wall 50 could comprise a circumference that is greater or less than sixteen inches.

Preferably, outer edges 32 and 42 of first side 30 and second side 40, respectively, and peripheral wall 50 possess a plurality of incremental line markers for measuring linear distances along a selected surface. More specifically, outer edges 32 and 42, and peripheral wall 50, preferably comprise incremental line markers 34, 44 and 54, respectively, wherein incremental line markers 34, 44 and 54 are preferably spaced ⅛ of an inch from each other, respectively. Outer edges 32 and 42 of wheel 20 also preferably comprise graduated inch-demarcating numerals 36 and 46, respectively, preferably positioned at each one-inch interval. Wheel 20 further preferably comprises sixteen demarcating numerals 36 and 46, respectively, wherein the demarcating numerals that embody the number "16" are preferably enclosed by triangles 38 and 48, respectively.

Preferably, first side 30 and second side 40 of wheel 20 comprise secondary inch-demarcating numerals 37 and 47, respectively, and tertiary inch-demarcating numerals 39 and 49, respectively. Secondary inch-demarcating numerals 37 and 47 preferably indicate the distance measured after a second revolution of wheel 20, as more fully described below; and, tertiary inch-demarcating numerals 39 and 49 preferably indicate the distance measured after a third revolution of wheel 20, also as more fully described below. It is contemplated in an alternate embodiment that wheel 20 could comprise any number, layout and/or form of markers and/or demarcating numerals, so long as tool 10 is capable of measuring selected distances.

Referring back to FIGS. 1–4, wheel 20 is preferably retained within housing 70, wherein housing 70 preferably generally comprises first side 72, second side 74, first wall 76, second wall 78, third wall 80, fourth wall 82, fifth wall 84, and inner cavity 86. Housing 70 is preferably formed from aluminum; however, it is recognized that housing 70 could alternatively be formed from stainless steel, plastic, wood, and/or other suitable, strong, rigid materials.

Preferably, first side 72 and second side 74 of housing 70 are substantially P-shaped, wherein first side 72 and second side 74 preferably comprise raised peripheral edges 230 and 240, respectively. Preferably, first side 72 is parallel to second side 74, wherein first side 72 is connected to second side 74 by first wall 76, second wall 78, third wall 80, fourth wall 82, and fifth wall 84. Additionally, first side 72 and second side 74 are preferably each positioned at ninety-degree angles from first wall 76, second wall 78, third wall 80, fourth wall 82, and fifth wall 84. Preferably, first wall 76 is adjacent to second wall 78 and disposed at a ninety-degree angle therefrom. Second wall 78 is preferably adjacent to third wall 80 and disposed at a ninety-degree angle therefrom. Third wall 80 is preferably adjacent to fourth wall 82 and disposed at a forty-five-degree angle therefrom. Fourth wall 82 is preferably adjacent to fifth wall 84 and disposed at a forty-five-degree angle therefrom. Corners 81, 83, 85 and 87 are preferably formed between first wall 76 and second wall 78, second wall 78 and third wall 80, third wall 80 and fourth wall 82, and fourth wall 82 and fifth wall 84, respectively, wherein corners 81, 83, 85 and 87 are preferably utilized to measure ninety and forty-five degree angles, as more fully described below.

Figure 2:
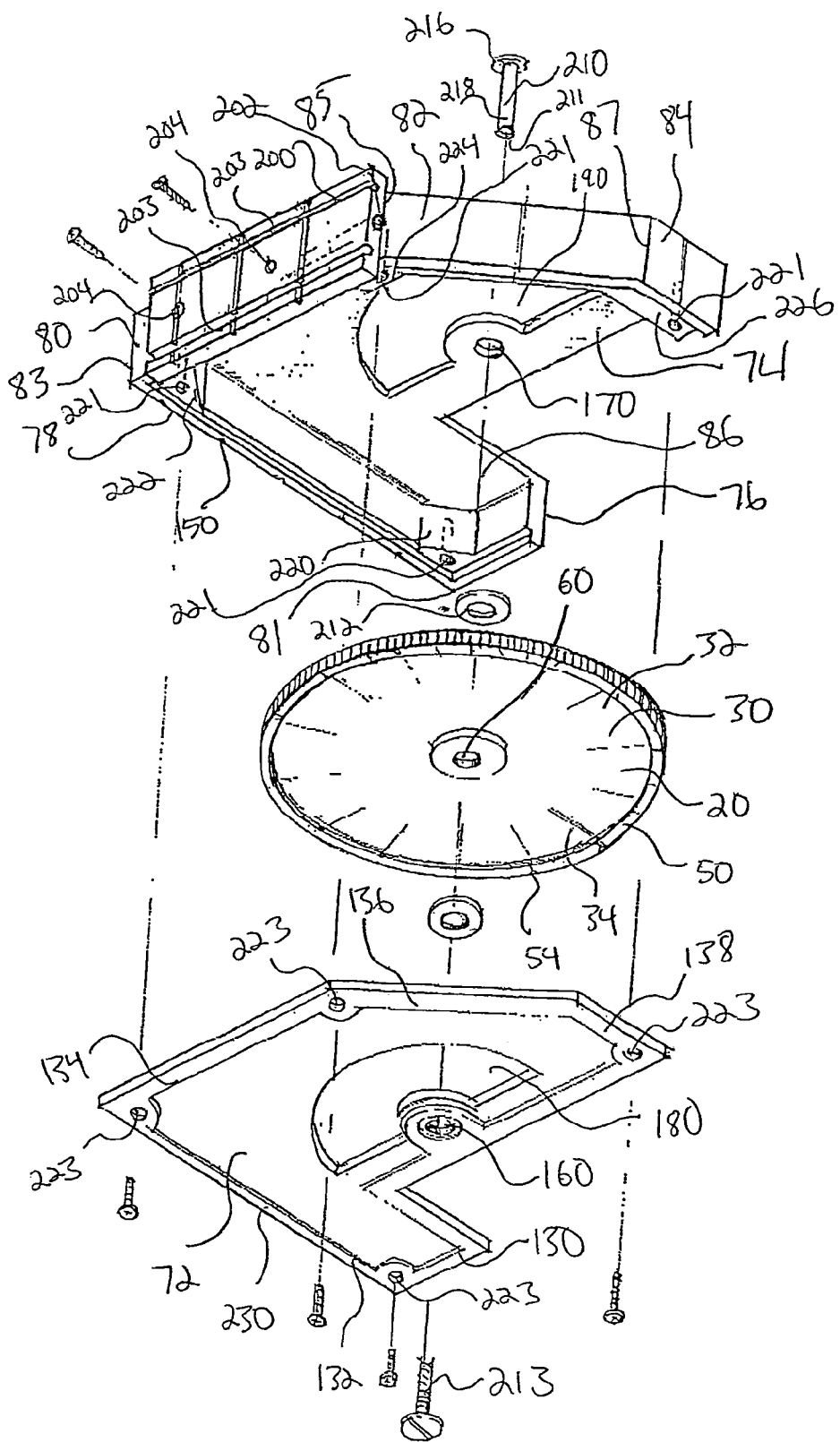
FIG. 2 is an exploded view of a preferred embodiment of the present invention with demarcating numerals and markings removed for clarity.
Figure 3:
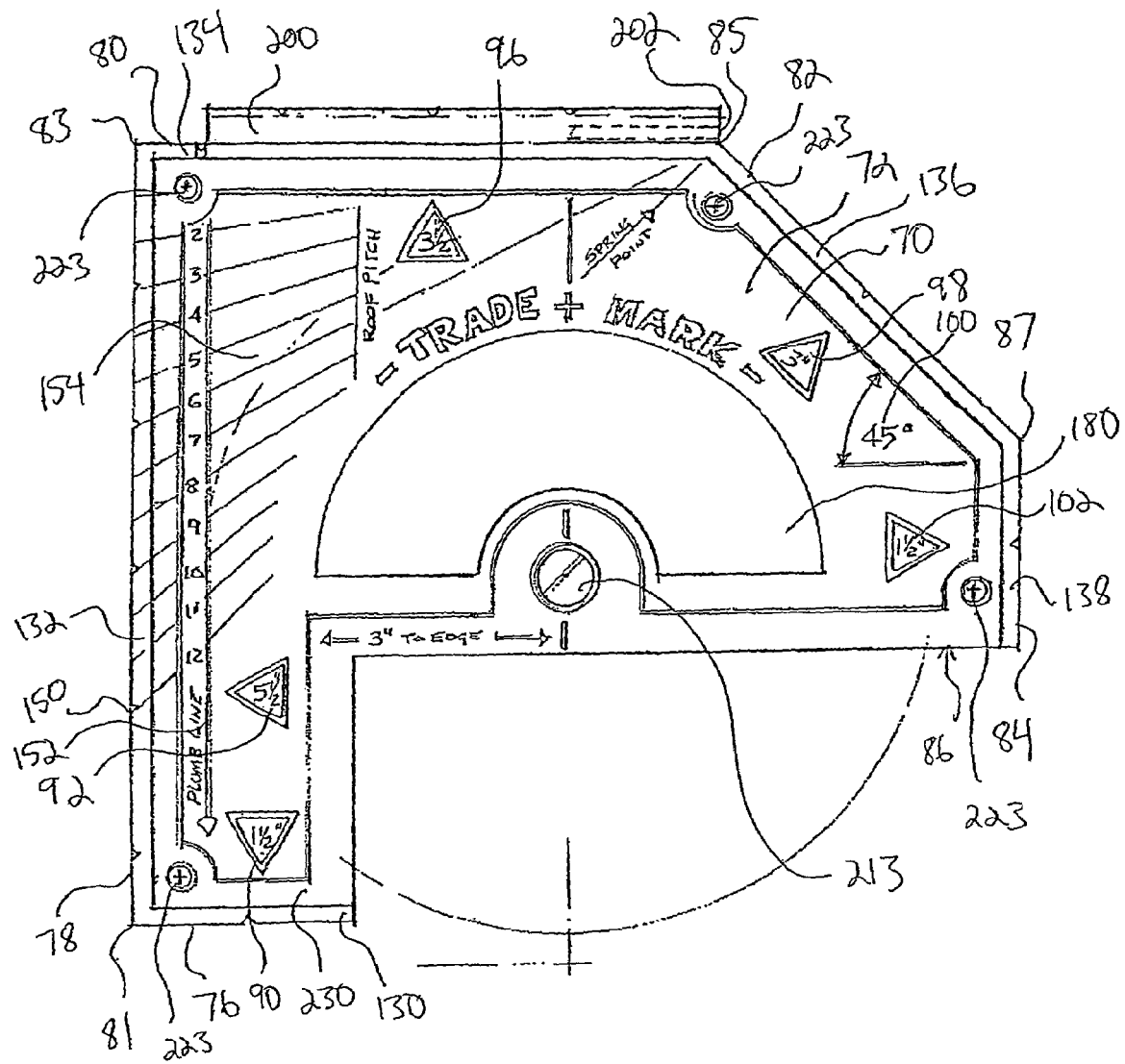
FIG. 3 is a front view of a preferred embodiment of the present invention, showing markings thereon.
Figure 4:
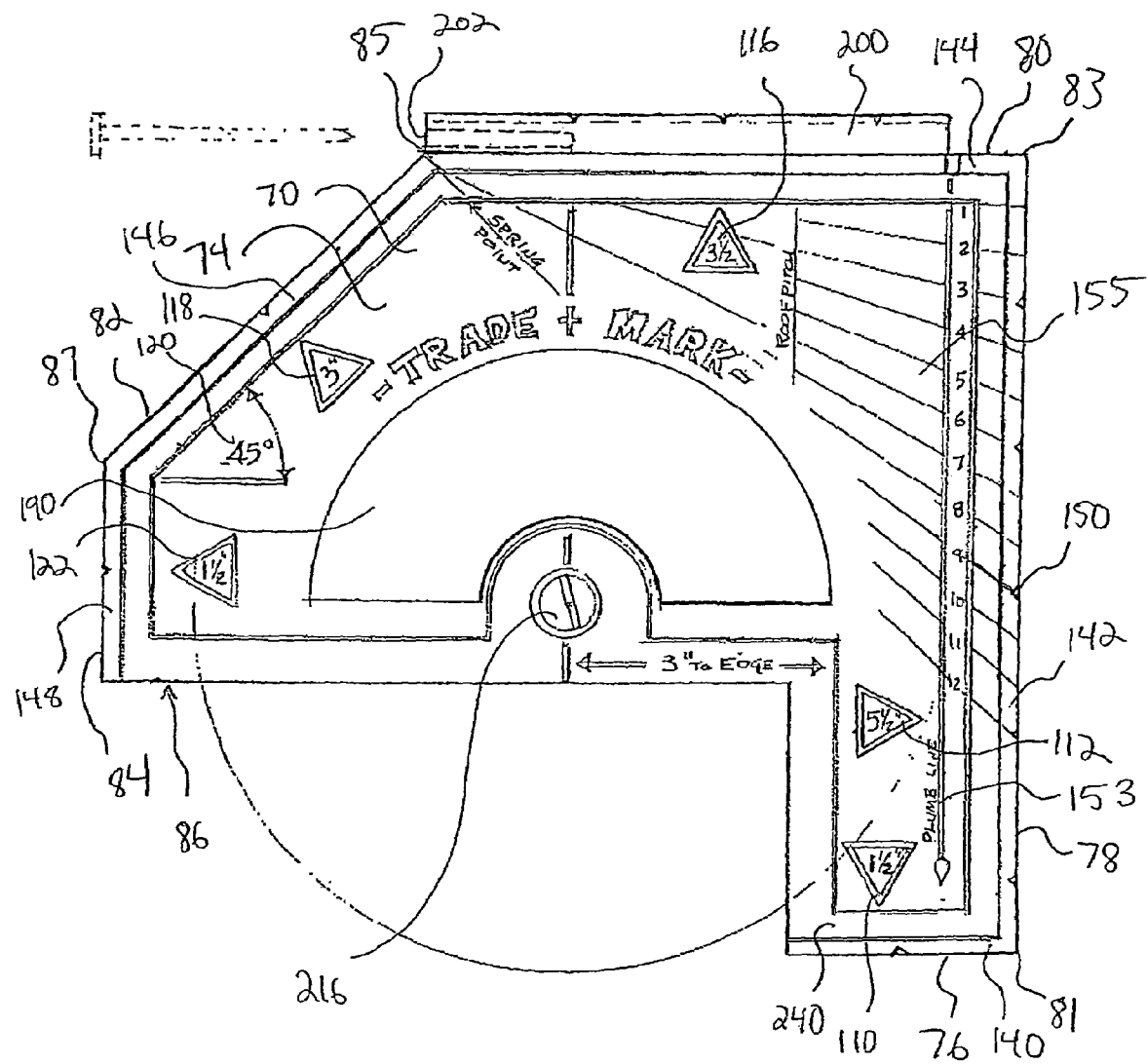
FIG. 4 is a rear view of a preferred embodiment of the present invention, showing markings thereon.

Preferably, first wall 76, second wall 78, third wall 80, fourth wall 82, and fifth wall 84 are permanently affixed to second side 74. Preferably, housing 70 further comprises securing blocks 220, 222, 224 and 226, wherein securing block 220 is situated between the intersection of first wall 76 and second wall 78; securing block 222 is situated between the intersection of second wall 78 and third wall 80; securing block 224 is situated between the intersection of third wall 80 and fourth wall 82; and, securing block 226 is situated proximate to fifth wall 84. Securing blocks 220, 222, 224 and 226 preferably possess screw holes 221, wherein second wall 78 preferably possesses screw holes 223 to removably secure first wall 76 to second wall 78 via screws, as illustrated in FIG. 2.

Housing 70 further preferably functions as a straight edge and/or gauging block, wherein housing 70 and its component parts are preferably dimensioned and configured to correspond to the sizes and angles most often encountered during framing. More specifically, first wall 76 is preferably 1½ inches long, second wall 78 is preferably 5½ inches long, third wall 80 is preferably 3 ½ inches long, fourth wall 82 is preferably 3 inches long, and fifth wall 84 is preferably 1½ inches long, thereby facilitating measurement of conventional framing sizes and lengths.

First side 72 and second side 74 of housing 70 further preferably comprise markings 90, 92, 94, 96, 98, 100 and 102, and markings 110, 112, 114, 116, 118, 120 and 122, respectively, for demarcating the lengths and angles most often encountered during framing. Preferably, markings 90, 92, 94, 96, 98, 100, 102, 110, 112, 114, 116, 118, 120 and 122 are generally triangular-shaped. Preferably, markings 90 and 110 are disposed proximate to first wall 76, markings 92 and 112 are disposed proximate to second wall 78, markings 96 and 116 are disposed proximate to third wall 80, markings 98 and 118 are disposed proximate to fourth wall 82, and markings 102 and 122 are disposed proximate to fifth wall 84. Preferably, markings 90, 92, 96, 98, 102, 110, 114, 116, 118 and 122 comprise numeric figures to indicate the length of the adjacent wall. Preferably, markings 100 and 120 are disposed proximate to corner 87, wherein markings 100 and 120 possess numeric figures to indicate a forty-five degree angle.

First side 72 and second side 74 of housing 70 also preferably comprise first edges 130 and 140, respectively, second edges 132 and 142, respectively, third edges 134 and 144, respectively, fourth edges 136 and 146, respectively, and fifth edges 138 and 148, respectively. First edges 130 and 140 are preferably disposed proximate to first wall 76, second edges 132 and 142 are preferably disposed proximate to second wall 78, third edges 134 and 144 are preferably disposed proximate to third wall 80, fourth edges 136 and 146 are preferably disposed proximate to fourth wall 82, and fifth edges 138 and 148 are disposed proximate to fifth wall 84. Preferably, first wall 76, second wall 78, fourth wall 82, fifth wall 84, and edges 130, 132, 134, 136, 138, 140, 142, 144, 146 and 148 possess a plurality of measuring notches 150, wherein measuring notches 150 are preferably positioned at one-inch intervals, and wherein measuring notches 150 are preferably provided to measure smaller distances. It is contemplated that housing 70 could comprise any number, configuration, and/or form of markings and notches, so long as the edges and/or walls of housing 70 can preferably be utilized as a measuring device.

First side 72 and second side 74 of housing 70 further preferably comprise plumb lines 152 and 153, respectively, and roof pitches 154 and 155, respectively, wherein plumb lines 152 and 153, and roof pitches 154 and 155, are preferably situated proximate second wall 78. Plumb lines 152 and 153 are preferably markings utilized to level tool 10 on a workpiece, wherein roof pitches 154 and 155 are preferably markings utilized to frame rafters and similar building components.

First side 72 and second side 74 of housing 70 further preferably comprise apertures 160 and 170, respectively, and windows 180 and 190, respectively. Apertures 160 and 170 are preferably circular-shaped and preferably centrally disposed on first side 72 and second side 74, respectively, to permit an axle to rotatably mount wheel 20 within inner cavity 86 of housing 70, as more fully described below. Preferably, windows 180 and 190 are formed proximate to apertures 160 and 170, respectively, wherein windows 180 and 190 are generally semi-circular shaped.

Housing 70 further preferably comprises lip 200, wherein lip 200 is preferably attached to third wall 80 to permit squaring of tool 10 onto a workpiece, such as a piece of lumber. Lip 200 preferably comprises blind nail hole 202 and string groove 203 for retaining plumb construction lines therewithin, wherein string groove 203 comprises a 'U'-shaped longitudinal channel. Lip 200 and third wall 80 preferably comprise threaded screw holes 204 for mounting lip 200 to tool 10; however, it is contemplated in an alternate embodiment that other suitable fasteners could be utilized, such as, for exemplary purposes only, rivets, bolts, glue, cement, solder, welding, or the like. Moreover, it is contemplated that tool 10 could possess any number, configuration and/or form of lips 200.

Figure 7:
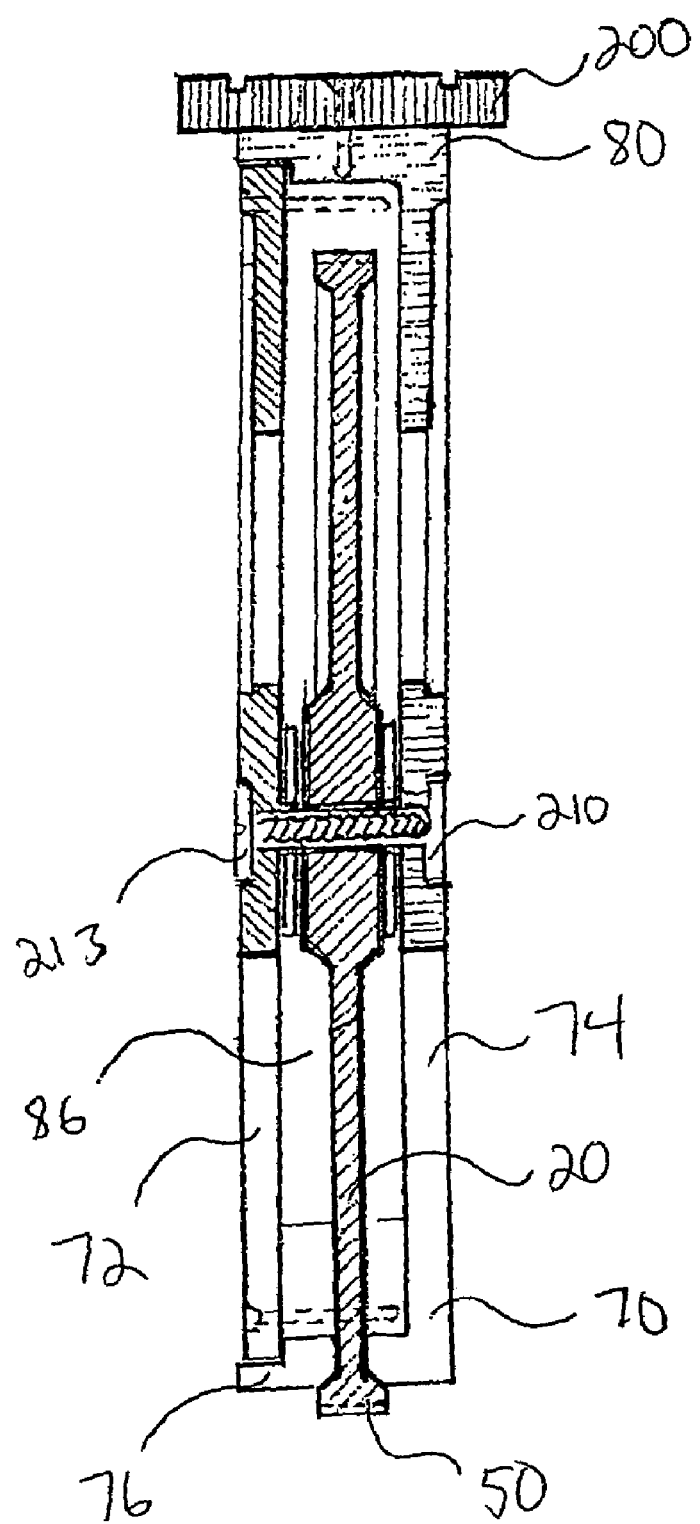
FIG. 7 is a cross-sectional view of a preferred embodiment of the present invention.

As illustrated in FIG. 7, wheel 20 is preferably rotatably mounted within inner cavity 86 of housing 70. Preferably, axle 210 is inserted into aperture 160, wherein axle 210 passes through washer 212, throughhole 60, washer 214, and out of aperture 170. Preferably, axle 210 comprises head 216 and cylindrical portion 218, wherein cylindrical portion 218 comprises threaded channel 211 for removably securing threaded bolt 213 therewithin. Threaded bolt 213 preferably secures axle 210 between first side 72 and second side 74 of housing 70, thereby rotatably mounting wheel 20 therewithin. It is contemplated in an alternate embodiment that other suitable fasteners could be utilized to rotatably mounted wheel 20 within housing 70, such as, for exemplary purposes only, rivets, bolts, dowels, pegs, bearing systems or the like.

A feature of the present invention is its unique combination and configuration of components that permit quick and easy measurement of linear distances along a selected workpiece, thereby expeditiously facilitating the process of laying out framing and trim components, especially in view of conventional utilization and application of a tape measurer or ruler. To operate tool 10, peripheral wall 50 of wheel 20 is preferably placed on a surface requiring measurement, wherein first side 72 and second side 74 of wheel 20 are preferably perpendicularly oriented to the surface, and wherein triangles 38 and 48 of wheel 20 are preferably positioned proximate to the surface. Preferably, triangles 38 and 48 function as a starting reference point, so that when wheel 20 is rolled along the surface, the number of inches traveled from the starting point is indicated by demarcating numerals 36, 37, 39, 46, 47, or 49 on wheel 20. Preferably, tool 10 allows a user to quickly and easily measure selected distances along a surface, wherein the user is able to easily mark the surface at selected intervals with a pen, pencil or marker, and wherein sixteen-inch increments are clearly indicated by triangles 38 and 48 to facilitate marking the surface at sixteen-inch intervals.

In addition to retaining wheel 20, housing 70 also preferably functions as a straight edge and/or gauging block, wherein housing 70 and its component parts are preferably dimensioned and configured to correspond to the sizes and angles most often encountered during framing. For example, the corners of housing 70 preferably permit a user to layout studs and/or other framing components at ninety and/or forty-five degree angles. Furthermore, first wall 76, second wall 78, third wall 80, fourth wall 82, and fifth wall 84 of housing 70 can be placed on a surface to measure dimensions commonly encountered during framing, such as, for exemplary purposes only, 1½ inches (edge of 2x board), 3 inches (edge of double 2x boards), 3½ inches (2×4 stud) and 5½ inches (2×6 stud). First wall 76, second wall 78, fourth wall 82, fifth wall 84 and lip 200 of housing 70 also preferably possess measuring notches 150 for measuring smaller distances in ½-inch intervals.

Referring now more specifically to FIGS. 8–12, illustrated therein is an alternate embodiment of tool 10, wherein the alternate embodiment of FIGS. 8–12 is substantially equivalent in form and function to that of the preferred embodiment detailed and illustrated in FIGS. 1–7 except as hereinafter specifically referenced. Specifically, the embodiment of FIGS. 8–12 comprises 1-inch markers 250, ¼-inch markers 252, ⅛-inch markers 254, distance demarcating numerals 256, and roof pitch markers 258 to facilitate measurement of conventional framing sizes and lengths.

In another alternate embodiment, housing 70 could embody other suitable shapes and/or sizes, provided that housing 70 is preferably dimensioned and configured to measure sizes and angles commonly encountered during framing. In such an embodiment, wheel 20 is capable of freely rotating within housing 70, wherein peripheral wall 50 of wheel 20 is able to contact a surface requiring measurement.

In still another alternate embodiment, first side 72 and second side 74 of housing 70 could comprise triangular cutouts for measuring forty-five-degree angles, wherein the cutouts could be isosceles triangles having two forty-five degree angles each. The cutouts could be disposed proximate to corner 83, in such a manner so as to not be obscured by wheel 20.

In yet another alternate embodiment, tool 10 could comprise measuring notches, incremental line markers and demarcating numerals positioned at alternatively suitable increments, such as, for exemplary purposes only, every ⅛ inch, ¼ inch, ½ inch, every inch and/or at any other increments in accord with industry standard and/or changes to industry standard.

In still yet another alternate embodiment, each side of wheel 20 could comprise two sets of incremental line markers and demarcating numerals, wherein an outer set of incremental line markers and demarcating numerals could define a scale for measuring distances in inches, and wherein an inner set of incremental line markers and demarcating numerals could define a scale for measuring distances in centimeters.

In further another alternate embodiment, tool 10 could comprise and be configured to retain a wheel having a twelve-inch circumference, nineteen and two-tenths-inch circumference, twenty-four-inch circumference, or any other circumference in accord with industry standard and/or changes in industry standard.

In still a further alternate embodiment, tool 10 could comprise and be configured to retain interchangeable wheels having varying circumferences.

In yet a further alternate embodiment, wheel 20 could comprise one or more built-in marking utensils or instruments to mark a surface at selected intervals.

In still yet a further alternate embodiment, housing 70 could possess a clip to retain tool 10 on a user's tool belt.

In another alternate embodiment, housing 70 could possess a retractable measuring tape.

In yet another alternate embodiment, housing 70 could possess a light source to illuminate a work surface in dark locations.

In still another alternate embodiment, housing 70 could possess a stud finder.

In still yet a another alternate embodiment, housing 70 could possess a leveler or a laser-guided alignment device.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed is:

1. An apparatus for measuring distances, said apparatus comprising:
   a housing that functions as a layout tool, said layout tool selected from a group consisting of a straight edge, a gauging block, a ruler, or a combination thereof, wherein said housing further comprises a truncated flat front wall, said front wall enabling said housing to rest against a wall surface;
   a single wheel, rotatably disposed within said housing, said single wheel comprising incremental line markers for measuring distances solely via revolution of said single wheel, wherein said incremental line markers enable measurement and display of distances based upon a fraction of a first revolution of said single wheel and optionally fractions of additional revolutions of said single wheel; and
   a squaring lip, wherein said squaring lip is disposed on said housing, wherein said squaring lip comprises a string groove, and wherein said string groove comprises a 'U'-shaped longitudinal channel.

2. The apparatus of claim 1, wherein said single wheel comprises a circumference, said circumference selected from a group consisting of a 12-inch circumference, a 16-inch circumference, a nineteen and two-tenths-inch circumference, and a 24-inch circumference.

3. The apparatus of claim 1, wherein said housing comprises a sidewall, said sidewall comprising measuring notches for measuring linear distances.

4. The apparatus of claim 1, wherein said housing comprises a sidewall comprising a length, said length selected from a group consisting of 1½ inches, 3 inches, 3½ inches, and 5½ inches.

5. The apparatus of claim 1, wherein said housing comprises a first sidewall adjacently disposed to a second sidewall at an angle selected from a group consisting in of 45 degrees and 90 degrees.

6. The apparatus of claim 1, wherein said squaring lip comprises a blind nail hole.

7. The apparatus of claim 1, wherein said housing comprises an enlarged cutout, wherein said enlarged cutout permits a large portion of said single wheel to be exposed for contacting a workpiece, and wherein said enlarged cutout provides an additional viewing area for viewing said incremental line markers of said single wheel.

8. The apparatus of claim 1, wherein said housing further comprises plumb lines and roof pitches, and wherein said plumb lines comprise markings utilized to level said apparatus on a workpiece, and wherein said roof pitches comprise markings utilized to frame rafters and similar building components.

9. An apparatus for measuring distances, said apparatus comprising:
   a housing comprising edges dimensioned and configured to correspond to the sizes and angles most often encountered during framing;

a single wheel rotatably disposed within said housing, said single wheel comprising incremental line markers for measuring distances; and a squaring lip, wherein said squaring lip is disposed on said housing, wherein said squaring lip comprises a string groove, and wherein said string groove comprises a 'U'-shaped longitudinal channel.

10. The apparatus of claim 9, wherein said single wheel comprises a circumference, said circumference selected from a group consisting of a 12-inch circumference, a 16-inch circumference, an nineteen and two-tenths-inch circumference, and a 24-inch circumference.

11. The apparatus of claim 9, wherein said housing comprises a sidewall, said sidewall comprising measuring notches for measuring linear distances.

12. The apparatus of claim 9, wherein said housing comprises a sidewall comprising a length, said length selected from a group consisting of 1½ inches, 3 inches, 3½ inches, and 5½ inches.

13. The apparatus of claim 9, wherein said housing comprises a 'P'-shape comprising a base wall disposed parallel to a work surface, a rear wall disposed ninety degrees from said base wall away from the work surface, a top wall disposed ninety degrees from said rear wall and parallel to said base wall, an angled wall disposed forty-five degrees from said top wall extending toward the work surface, and a front wall disposed forty-five degrees from said angled wall, wherein said front wall enables said housing to rest against a wall surface perpendicular to the work surface.

14. The apparatus of claim 9, wherein said squaring lip comprises a blind nail hole.

15. The apparatus of claim 9, wherein said housing comprises an enlarged cutout, wherein said enlarged cutout permits a large portion of said single wheel to be exposed for contacting a workpiece, and wherein said enlarged cutout provides an additional viewing area for viewing said incremental line markers of said single wheel.

16. An apparatus for measuring distances, said apparatus comprising:

a housing comprising edges dimensioned and configured to correspond to the sizes and angles most often encountered during framing;

a single wheel rotatably disposed within said housing, said single wheel comprising incremental line markers for measuring distances; and a squaring lip, wherein said squaring lip is disposed on said housing, wherein said housing comprises a 'P'-shape comprising a base wall disposed parallel to a work surface, a rear wall disposed ninety degrees from said base wall away from the work surface, a top wall disposed ninety degrees from said rear wall and parallel to said base wall, an angled wall disposed forty-five degrees from said top wall extending toward the work surface, and a front wall disposed forty-five degrees from said angled wall, wherein said front wall enables said housing to rest against a wall surface perpendicular to the work surface, and wherein said housing further functions as a gauging block, and wherein said front wall is disposed perpendicular to a workpiece surface when said single wheel of said apparatus is disposed upon the workpiece.

* * * * *